US012761979B2

(12) United States Patent
Xu et al.

(10) Patent No.: US 12,761,979 B2
(45) Date of Patent: Oct. 13, 2026

(54) LARGE LANGUAGE MODEL AND DETERMINISTIC CALCULATOR SYSTEMS AND METHODS

(71) Applicant: INTUIT INC., Mountain View, CA (US)

(72) Inventors: Na Xu, Mountain View, CA (US); Meng Chen, Mountain View, CA (US); Conrad De Peuter, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 472 days.

(21) Appl. No.: 18/455,595

(22) Filed: Aug. 24, 2023

(65) Prior Publication Data

US 2025/0068488 A1 Feb. 27, 2025

(51) Int. Cl.

| | |
|---|---|
| ***G06F 9/44*** | (2018.01) |
| ***G06F 9/54*** | (2006.01) |
| ***G06F 40/40*** | (2020.01) |
| *G06Q 40/12* | (2023.01) |

(52) U.S. Cl.

CPC ................ *G06F 9/54* (2013.01); *G06F 40/40* (2020.01); *G06Q 40/123* (2013.12)

(58) Field of Classification Search

CPC .................................... G06F 9/40; G06F 9/54
USPC .......................................................... 719/328
See application file for complete search history.

(56) References Cited

U.S. PATENT DOCUMENTS

| | | | | |
|---|---|---|---|---|
| 10,418,032 | B1 * | 9/2019 | Mohajer | G10L 15/1815 |
| 2006/0271364 | A1 * | 11/2006 | Mirkovic | G10L 15/22 704/E15.044 |
| 2015/0142704 | A1 * | 5/2015 | London | G10L 15/1822 706/11 |
| 2015/0348551 | A1 * | 12/2015 | Gruber | G10L 15/1822 704/235 |
| 2023/0259705 | A1 * | 8/2023 | Tunstall-Pedoe | G06N 3/0499 704/9 |

* cited by examiner

*Primary Examiner* — Timothy A Mudrick
(74) *Attorney, Agent, or Firm* — DLA PIPER LLP US

(57) ABSTRACT

At least one large language model (LLM) may be instructed to request data from a user while being prevented from performing calculations using the data. A user-generated response to the request for data, including at least a portion of the data, may be received. The user-generated response may be translated into a machine-readable response in a format configured for processing by a calculation engine. The calculation engine may process the machine-readable response, thereby generating a calculation engine output.

20 Claims, 8 Drawing Sheets

500

600

LARGE LANGUAGE MODEL AND DETERMINISTIC CALCULATOR SYSTEMS AND METHODS

BACKGROUND

Many computer systems employ very complex calculations and require similarly complex user interfaces and complex hardware/software integration. To give one example, computing an individual's tax burden is a process which requires hundreds of inputs as well as many nested calculations, with a backend calculation engine to take the inputs and run them through the calculation tree. Building software to enable this requires building many data collection screens as well as orchestration across those screens. The result is an extremely complex tree structure which is difficult and costly to maintain. Moreover, data collection is hard-coded, only enables the system to ask about one component at a time, and does not handle free-form text to data model disambiguation. Some view large language models (LLMs) as presenting a possible opportunity to automate away from some of these complexities, but many LLMs have been shown to struggle with complex calculations and maintaining consistency.

BRIEF DESCRIPTIONS OF THE DRAWINGS

DETAILED DESCRIPTION OF SEVERAL EMBODIMENTS

Systems and methods described herein can leverage LLMs as data collection tools. For example, LLMs can obtain data from users through a conversation in a user interface (UI) setting instead of, or in combination with, tree structure-based UI systems. Indeed, using an LLM instead of a tree structure-based UI system can allow such data collection systems to greatly reduce their own internal complexities. There may be no need to maintain, update, debug, and check a tree structure. Instead, any systemic complexities can be offloaded to the LLM system, which can be hosted and maintained separately from the data collection system, improving performance and latency of the data collection system.

At the same time, care may be taken to ensure that any processing or calculations using the data collected by the LLM are handled by appropriate processing or calculation systems, and not by the LLM. The LLM and the processing/calculation backend may be integrated so that the LLM is prevented from making calculations, and the LLM provides data to the backend that is seamlessly ingestible and usable by the backend.

In some embodiments, the disclosed systems and methods can incorporate techniques, methods, and components that maintain consistency between non-deterministic LLM elements and deterministic elements such as processing/calculation backend elements. Alternatively or additionally, the features that maintain consistency between non-deterministic and deterministic elements can be employed in other contexts besides the LLM/KE combinations proposed herein.

For example, LLMs can offer a wide range of features, including translation, robustness to misspelled inputs, intelligent routing, and more. When building a LLM application, small tweaks in the input prompt or training data can lead to regression in unexpected behaviors and diverge from expected behavior, even when the tweaks are seemingly unrelated to the behavior loss. However, a robust testing framework can solve the issues that standard testing does not accommodate for LLM workflows. To give an illustrative, non-limiting example, if a user tells an LLM that they have a dependent, then the information about the dependent must be collected by the LLM, but if there is no dependent, it must be ensured that the LLM does not collect erroneous information about a dependent.

By employing LLM-based bots to simulate conversations and/or a robust regression testing framework, disclosed embodiments can improve reliability of LLM behaviors through prompt changes. Utilizing a combination of an LLM model and a deterministic calculation engine, these embodiments can provide a robust testing process that mirrors traditional regression tests while handling the stochastic nature of LLM outputs.

Figure 1A:
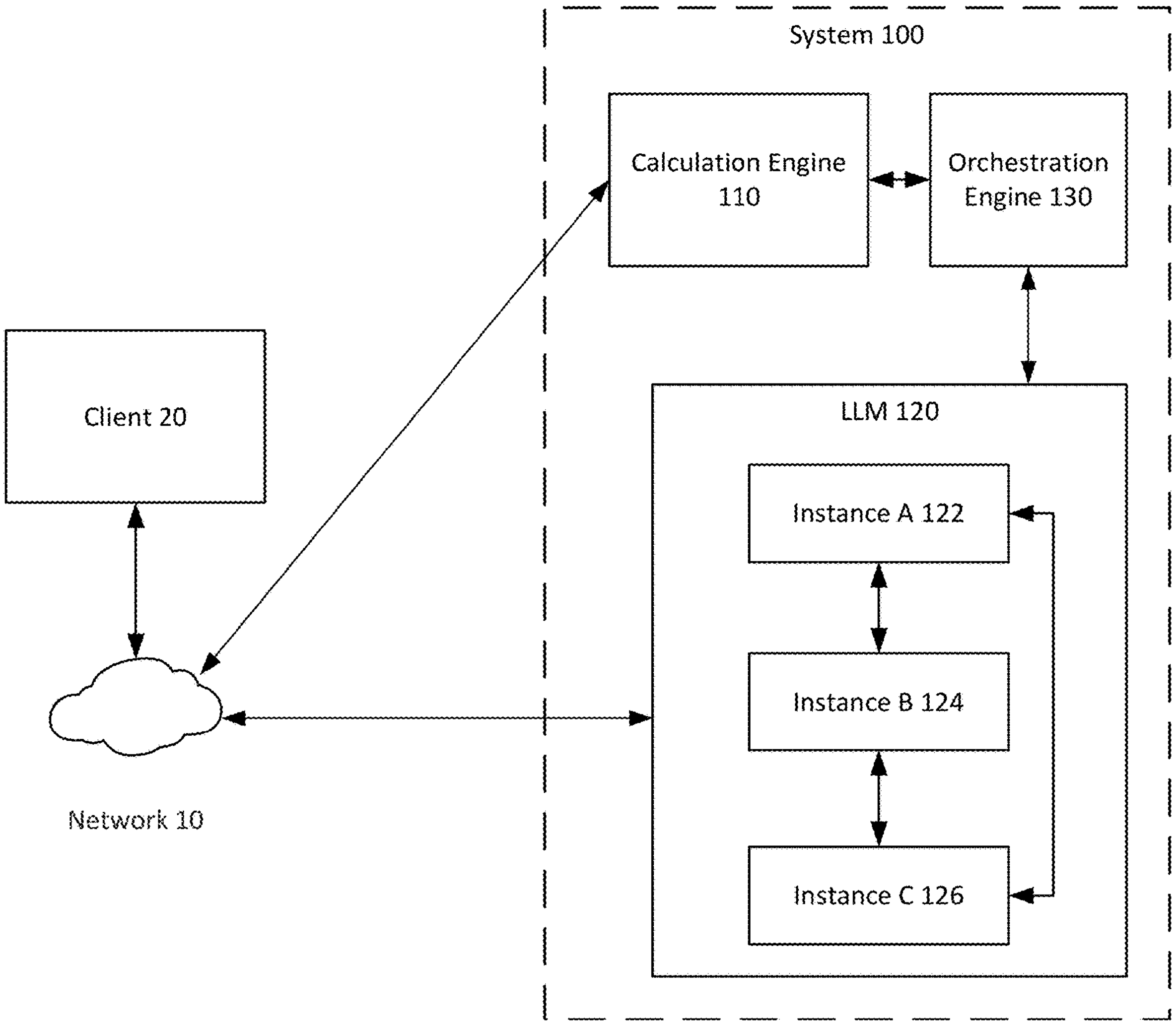
FIG. 1A shows an example of an interconnected large language model and calculation system according to some embodiments of the disclosure.
Figure 1B:
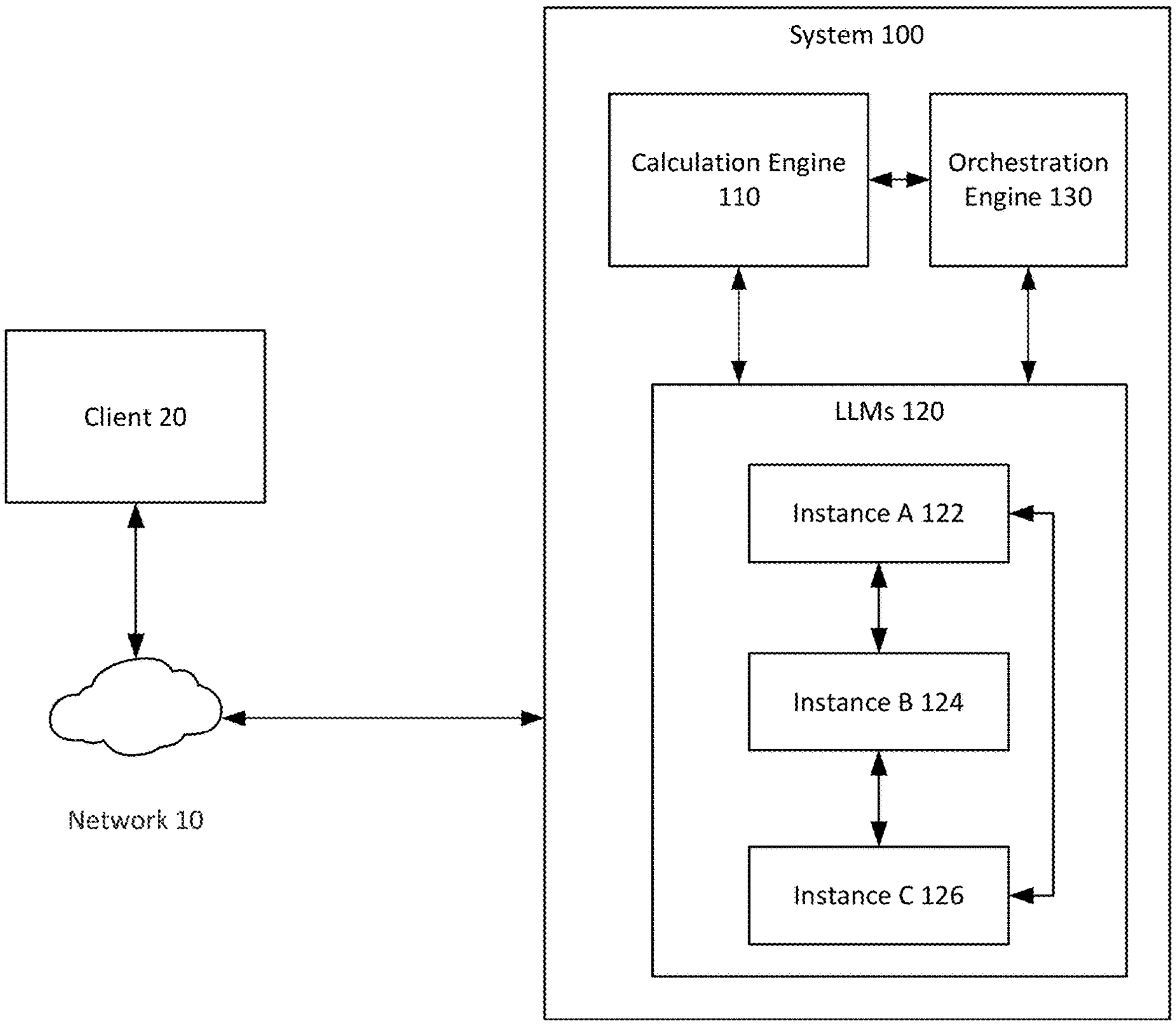
FIG. 1B shows another example of an interconnected large language model and calculation system according to some embodiments of the disclosure.

FIGS. 1A and 1B show examples of interconnected LLM and calculation engine (KE) system 100 configurations according to some embodiments of the disclosure. System 100 may include a variety of hardware, firmware, and/or software components that interact with one another, such as KE 110 and LLM 120. The operations of KE 110 and LLM 120 are described in greater detail below, but in general, KE 110 can be any computing services performing calculations and/or other processing operations on data (e.g., data received from client 20), and LLM 120 can be any computing services providing a non-deterministic interface for interaction with client 20 and/or other computing services. System 100 can also include orchestration engine 130, which can coordinate the operations of KE 110 and LLM 120, as described in detail below. Some components may communicate with one another and/or with client(s), such as client 20, through one or more networks 10 (e.g., the Internet, an intranet, and/or one or more networks that provide a cloud environment). For example, as described in detail below, client 20 can display a UI with elements provided by LLM 120, and LLM 120 can obtain data from a user of client 20 via interactions through the UI. In some embodiments, such as the example of FIG. 1A, system 100 components can be provided by separate computing devices communicating with one another through network 10. For example, KE 110 and LLM 120 may be respectively provided within different computing environments connected by network 10 (e.g., KE 110 may be part of a data processing environment and LLM 120 may be provided by a dedicated LLM service). In other embodiments, such as that of FIG. 2B, KE 110 and LLM 120 may be part of the same computing environment. Each component may be implemented by one or more computers (e.g., as described below with respect to FIG. 7).

As described in detail below, system 100 can use LLM 120 to collect data from client 20 for processing by KE 110. Furthermore, in some embodiments, system 100 may include features that improve and/or maintain consistency of LLM 120 operation. For example, FIGS. 2-6 illustrate the functioning of the illustrated components in detail.

System 100 can reduce the complexity of data collection and processing systems through the combination of LLM 120 and KE 110. By leveraging the LLM 120 for data collection, and completely decoupling data collection with calculations made by KE 110, the engineering complexity of system 100 is greatly reduced, with no loss to the calculation complexity. Moreover, while LLMs are notoriously weak at arithmetic, system 100 can leverage the language strengths of LLMs while eliminating the risk of LLM arithmetic mistakes.

In system 100, calculations and data collections can be completely decoupled. LLM 120 can handle the data collection processing, while KE 110 can handle calculations. As described in detail below, in an initial prompt, LLM 120 can be fed the complete data model to collect and can be configured to repeatedly question the user until the data model is completely filled.

Throughout processing, orchestration engine 130 can handle orchestration and state, as described in detail below. For example, orchestration engine 130 can maintain a data model for each customer. For every customer response, orchestration engine 130 can send an extra request to LLM 120 asking for the latest updates to the data model, and what question should be asked to the customer next. LLM 120 can handle disambiguation of the customer verbiage to the explicit data model (e.g., "i have no kids"→"num_dependents=0"). If LLM 120 has been trained to support multiple languages, those will work out of the box in system 100.

Elements illustrated in FIGS. 1A and 1B (e.g., system 100 including KE 110, LLM 120, and/or orchestration engine 130), network 10, and/or client 20) are each depicted as single blocks for ease of illustration, but those of ordinary skill in the art will appreciate that these may be embodied in different forms for different implementations. For example, while KE 110, LLM 120, and orchestration engine 130 are depicted separately, any combination of these elements may be part of a combined hardware, firmware, and/or software element. Likewise, while KE 110, LLM 120, and orchestration engine 130 are each depicted as parts of a single system 100, any combination of these elements may be distributed among multiple logical and/or physical locations. Indeed, the disclosed embodiments provide improvements to distributed computing arrangements. Moreover, FIGS. 1A and 1B each show a single instance of KE 110 and orchestration engine 130 and three instances of LLM 120 (instance A 122, instance B 124, and instance C 126) for ease of explanation of certain operations, varying numbers of instances of KE 110, LLM 120, and/or orchestration engine 130 may be possible in various embodiments. Also, while one network 10, one client 20, and one system 100 are illustrated, this is for clarity only, and multiples of any of the above elements may be present. In practice, there may be single instances or multiples of any of the illustrated elements, and/or these elements may be combined or co-located.

In the following descriptions of how system 100 functions, several examples are presented. These examples are in the context of tax calculation processing on data obtained from client 10. However, those of ordinary skill in the art will appreciate that these examples are merely for illustration, and system 100 and its methods of use and operation are extendable to other application and data contexts.

Figure 2:
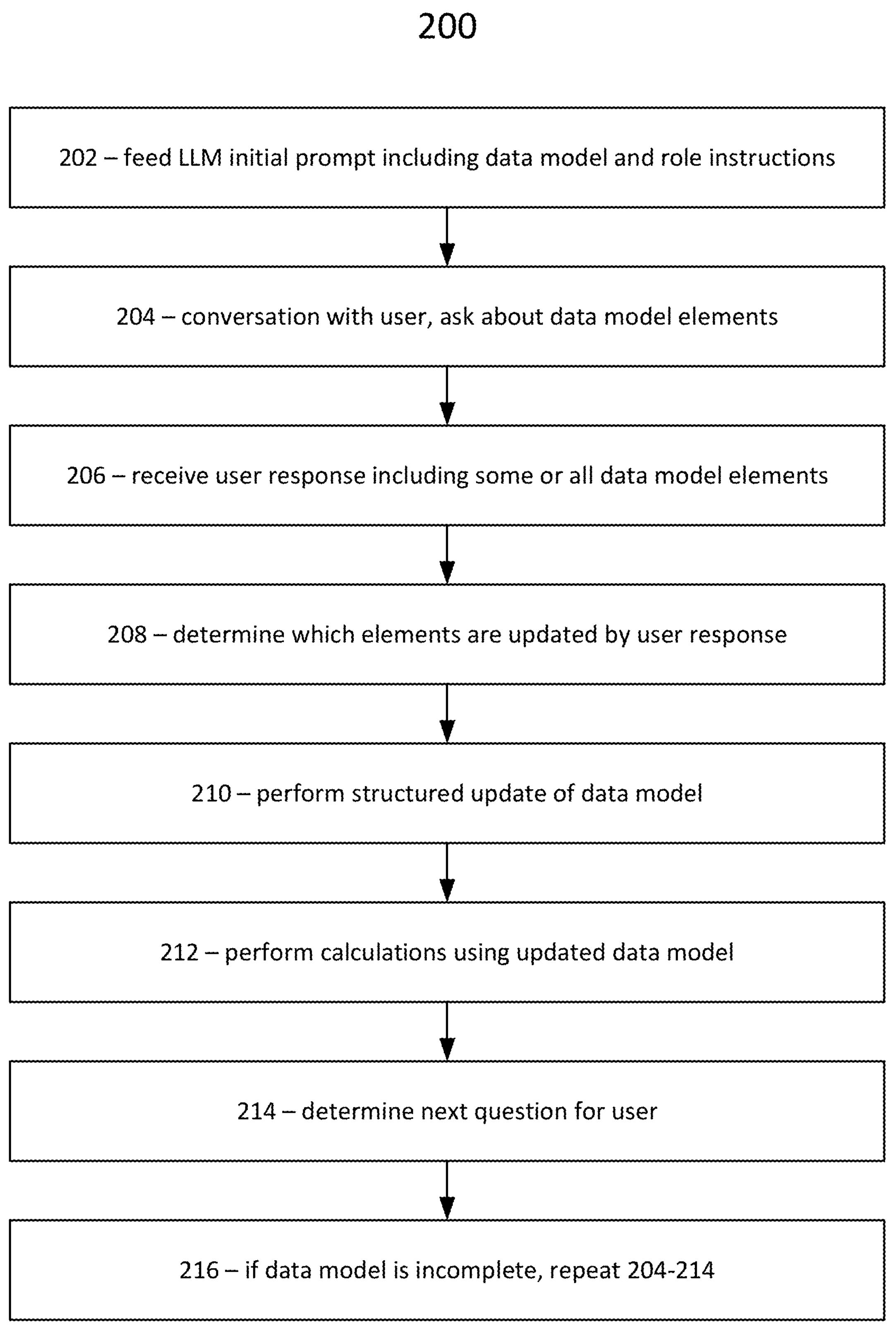
FIG. 2 shows an example process of interaction between a client and the interconnected system according to some embodiments of the disclosure.

FIG. 2 shows an example process 200 of interaction between client 20 and system 100 according to some embodiments of the disclosure. Process 200 is an example of how a user of client 20 can have a conversation with LLM 120 of system 100 and thereby supply information used by KE 110. This example is provided to give context for the following descriptions of the inner functioning of these and other system 100 elements.

At 202, system 100 can feed LLM 120 an initial prompt including a data model and instructions relating to the role to be played by the LLM 120. For example, as described in detail below, system 100 can use prompt engineering to formulate a prompt. The prompt can be configured to at least relatively constrain LLM 120 to a conversation focused on eliciting answers that include data that fills in open portions of the data model.

At 204, LLM 120 of system 100 can initiate a conversation with the user. In the conversation, LLM 120 can ask customer about data model elements. For example, if the data model is a tax data model configured to obtain information used to fill out a tax return, questions may be related to obtaining such information (e.g., "are you married?").

At 206, system 100 can receive a response from the user in plain text. The response may include a partial or complete answer to the question(s) posed by LLM 120.

At 208, system 100 can determine which, if any, elements of the data model are updated by the response received at 206. LLM 120 may include out of the box multi-language support, enabling LLM 120 to translate an answer given in any language known to the LLM 120 into a language expected for filling in the data model. LLM 120 may also perform free-form data input to structured data model disambiguation (e.g., "we got hitched" may be converted to "'is_married'=True").

Assuming one or more elements of the data model can be updated using information in the response, at 210, system 100 can perform a structured update of the data model, which may include filling in the relevant data model elements using data from the user's response (e.g., filling in the entry for "marriage status" with "married" or a number chosen to represent married status).

At 212, KE 110 of system 100 can receive the complete data model, or the data model as far as it has been completed thus far, and perform calculations to further complete the model. Using the tax form model as an example, KE 110 can perform tax return calculations based on the data in the model (e.g., estimated refund, eligible credits+deductions, etc., any of which may be affected by marital status). These calculation results and/or data derived therefrom can be presented to the user (e.g., "your estimated refund is X").

At 214, system 100 can determine what is the next best question to ask the customer. If the entire data model is complete, the answer may be that there are no more questions required, or that the conversation can move to another topic. However, if the data model remains incomplete, system 100 can determine what remains to be filled in, and the questions can be constructed to elicit information to fill in remaining portions of the data model.

At 216, system 100 can repeat processing at 204-214 if the data model is incomplete. Once the data model is complete, process 200 can end. At this point, the data model may be ready for use (e.g., a tax return may be prepared, approved, and/or filed), and/or LLM 120 can move on to other conversation topics with the user.

Figure 3:
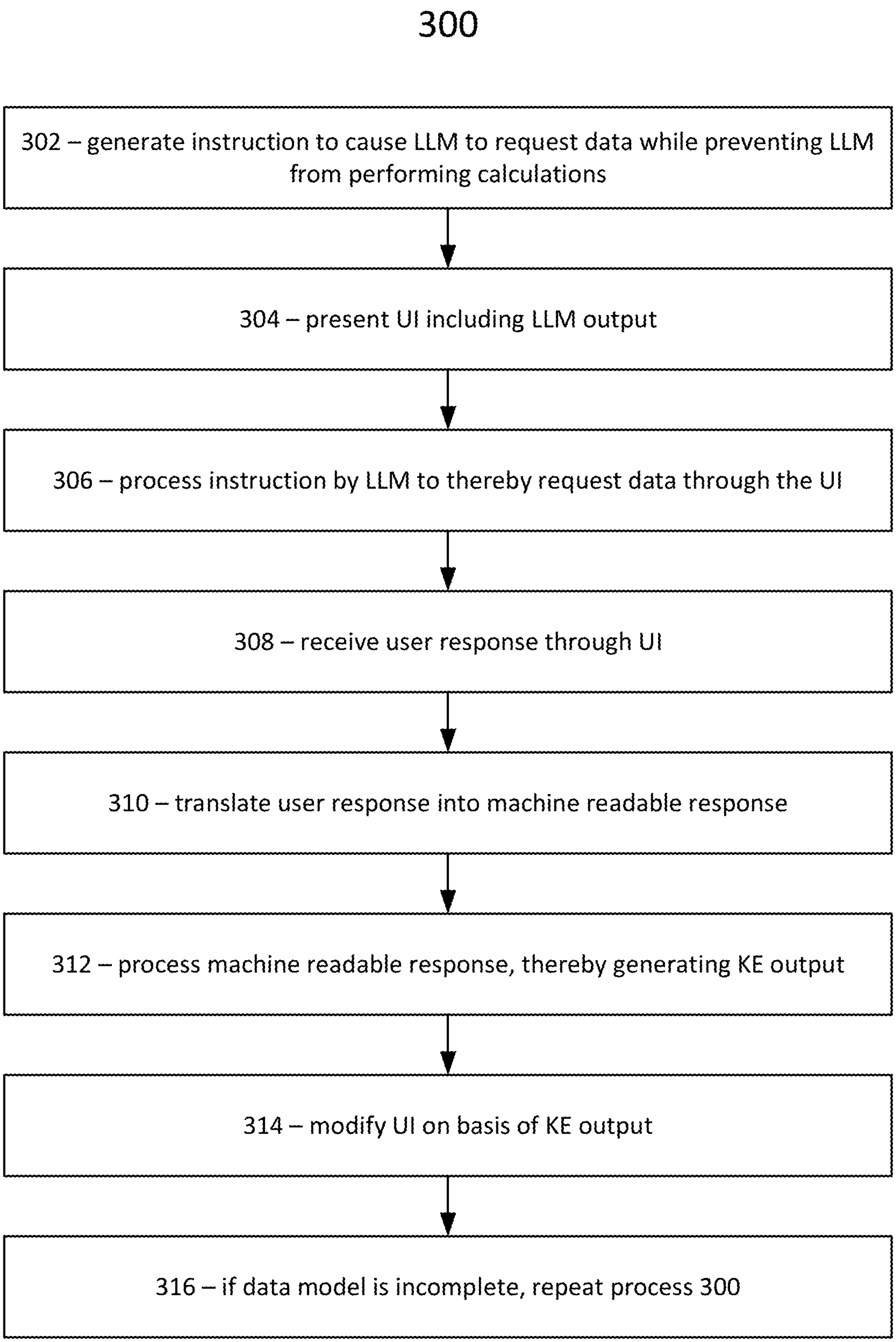
FIG. 3 shows an example integrated LLM/calculation process according to some embodiments of the disclosure.

FIG. 3 shows an example integrated LLM/calculation process 300 according to some embodiments of the disclosure. System 100 can perform process 300 in order to implement an interaction such as that presented in the context of process 200, thereby gathering information using a non-deterministic component and processing the information using a deterministic component. Certain technical details of system 100 component functioning in some embodiments are also described in the context of process 300 below.

At 302, system 100 can generate an instruction configured to cause LLM 120 to request data from a user while preventing LLM 120 from performing calculations using the data. In an example wherein LLM 120 is configured specifically for the purpose of functioning within system 100, the instruction can be hard-coded into LLM 120. If an off-the-shelf or otherwise more general purpose LLM 120 is used, the instruction can be in the form of a prompt given to LLM 120. The instruction may be supplied to the LLM 120 as required by the configuration of the LLM 120, for example using an application programming interface (API) of LLM 120 and/or by entering a textual prompt into a text form of LLM 120. A non-limiting example of a prompt that could be used to instruct LLM 120 to avoid calculating and only to collect information may be as follows in some embodiments: "You are not able to do calculations such as estimate or explain refund. Your only goal is to collect the information in the data model. When a user asks how you calculated their refund, explain that your role is to collect data and you are not calculating the refund yourself."

In some embodiments, the instruction can include a data model to be completed by data entered in response to questions posed by LLM 120. To continue the example wherein an integrated LLM 120/KE 110 is being used to fill in a tax return instead of a fully deterministic tax return system, the instructions can include the entire existing data model, or a portion thereof, that would otherwise have been traversed deterministically to complete the tax return. In some embodiments, the instruction can include a textual representation of the content of the data model. Including this as some or all of the prompt or context input to LLM 120 may allow LLM 120 to respond in a tailored (e.g., tax savvy) fashion, which may improve outcomes and satisfaction for the user. Alternatively or additionally, in the tax example, the instruction can include Internal Revenue Service (IRS) provided instructions for completing a tax return.

The data model may have multiple components thereof, so that the data the LLM 120 is tasked with obtaining from the user comprises multiple parts. In this case, the instruction can be configured to cause the LLM 120 to attempt to obtain a plurality of the multiple parts in a single user-generated response, or as few responses as possible. For example, LLM 120 can combine multiple questions into one, such as "Do you have any dividend or interest income?" In some cases, this can be context-sensitive (e.g., the previous question may be presented when income is below a threshold and the answer is likely "no" to both, whereas separate "Do you have interest," "Do you have dividends" questions can be posed when income is above the threshold and a "yes" answer becomes more likely).

In some embodiments, the instruction can restrict or prevent LLM 120 from processing the received data in the manner in which it is to be processed by KE 110. For example, LLM 120 can be directed not to perform calculations (e.g., tax calculations) using the data received from the user. In this way, system 100 can ensure that KE 110 is the component responsible for processing the received data (e.g., KE 110 is the component that ultimately performs calculations using the received data).

In some embodiments, the instruction can be constructed to ensure consistency based on consistency assurance testing performed by system 100. Details about such testing are provided below, and it will be understood by those of ordinary skill in the art that instructions improved by the testing techniques disclosed herein may be employed within process 300.

At 304, system 100 can present a UI including output of LLM 120 to the user. For example, LLM 120 output can be integrated into a UI of a broader system (e.g., a tax return preparation application or any other application having a deterministic processing backed element coupled with an LLM). Inputs made into the LLM 120 output UI element (e.g., free-form text into a text field) may also be collected by the LLM 120. For example, system 100 may send data to client 20, through network 10, causing display of the UI on a display element of client 20. An input device of client 20 may capture input made by a user and send the input to system 100 through network 10.

In some embodiments, integration of the LLM 120 output into a UI presented using client 20 may include the following. Client 20 may be in communication with system 100 through network 10, and orchestration engine 130 may create a session specific to the current user interaction being facilitated by client 20. Creating the session may include creating a cookie. Client 20 can store the cookie in its local browser. Orchestration engine 130 may expose an unauthenticated end point of LLM 120 that can take raw user input and return a raw text output as described in more detail below. The cookie value from the session can be used for further conversations, and all calls to LLM 120 for the conversation in question can be sandboxed in this manner.

During the session, context can be tracked and updated by system 100, so that as the LLM 120 is invoked moving forward, the current state of the data model and the conversation can persist. The session can have a timeout time or period, after which system 100 can close the chat, thereby preventing too many active connections with LLM 120.

At 306, system 100 can process, by LLM 120, the instruction to thereby provide the request for data through the UI. For example, as discussed above, LLM 120 can generate a question intended to elicit an answer including data for filling in a tax return data model. As non-limiting examples, the following questions may be provided in embodiments wherein LLM 120 is gathering data for filling in the tax return data model:

"Did you or your spouse participate in a retirement plan or contribute to an IRA? If so, how much did each of you contribute?"

"Do you or your spouse have any dependents? If yes, please provide the number of dependents and their age categories (under 13, under 17, or students aged 17 to 23)."

"Did you have any taxable wages or other income sources, like social security, interests or ordinary or qualified dividends?"

At 308, system 100 can receive, through the UI (e.g., from client 20 through network 10), a user-generated response to the request for data. The user-generated response may include at least a portion of the data. In some embodiments, LLM 120 can determine whether the user's response is compliant with a moderation policy. LLM 120 can generate a message indicating the response is out of compliance if such a determination is made, and client 20 can display the message in the UI. For example, if the above example questions are asked, a user could respond with answers such as "I contributed $21000 to an IRA," "I have 2 children under 13," and "I received social security benefits," respectively, or with other answers that may (or may not, in some cases) include a portion of the data.

At 310, system 100 can translate the user-generated response into a machine-readable response in a format configured for processing by KE 110. In some embodiments, translating can include generating a translation instruction configured to cause LLM 120 to convert the user-generated response into the machine-readable response. LLM 120 can process the translation instruction, and KE 110 can receive the machine-readable response from LLM 120.

Figure 4:
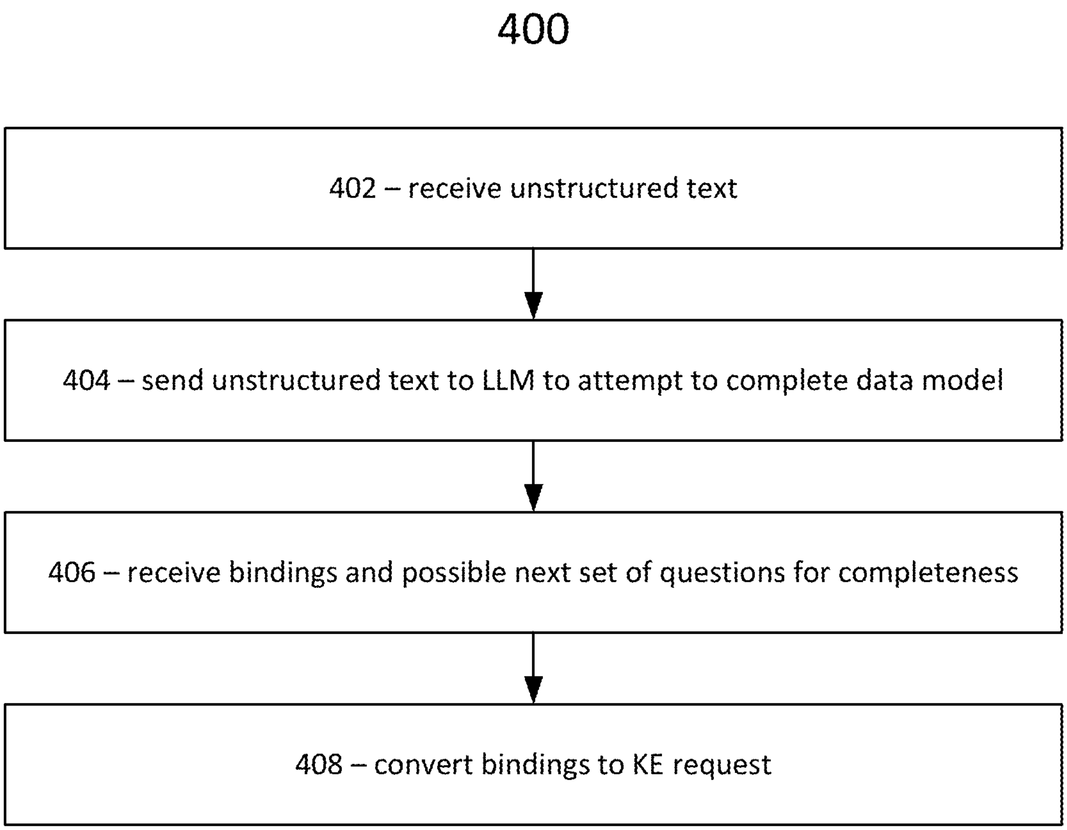
FIG. 4 shows an example translation process according to some embodiments of the disclosure.

For example, FIG. 4 shows an example translation process according to some embodiments of the disclosure. At 402, orchestration engine 130 can intercept the user-generated response received by LLM 120 when the user responds to the LLM 120 question in the UI. The user-generated response can be in the form of unstructured text. Orchestration engine 130 can drive the orchestration of KE 110 calculations based on the response, which can begin by structuring the response in a format suitable for processing by KE 110.

At 404, orchestration engine 130 can send the unstructured text to LLM 120 with instructions configured to cause LLM 120 to use the unstructured text to try to complete the data model. In some embodiments, different instances of LLM 120 may perform different portions of the process. For example, instance A 122 can carry on the conversation with the user, and instance B 124 can try to complete the data model. The instructions provided to each respective instance can dictate the task of each respective instance. For example, instance A 122 can be provided instructions like those given at 302 of process 300 configured to cause LLM 120 to request data from a user while preventing LLM 120 from performing calculations using the data. Instance B 124 can be given instructions configured to cause it to complete the data model, such as the following, non-limiting example instructions:

You are an information extractor that always responds with a JSON object. You will be given a JSON data model and a conversation. You need to extract the values from the conversation provided and use them to update the data model given below.

Examples

```
>> Input
Data Model: {{"info":{{"full_name":"string", "birthdate":"date"}}}}
assistant: What is your name and birthdate?
user: my name is John Doe and my birthdate is jan 1 2012.
>> Output
{{"info":{{"full_name":"John Doe"}}}}
==
>> Input
Data Model: {{"item":{{"amount":"float", "type":"string"}}}}
assistant: What was the amount?
user: $1701.12
>> Output
{{"item":{{"amount":1701.12}}}}
==
>> Input
Data Model: {{"section1":{{"value1":"boolean"}}}}
assistant: What is your value for section1: value1?
user: False
```

-continued

```
>> Output
{{"section1":{{"value1":False}}}}
```

At 406, LLM 120 can produce bindings (e.g., a fully qualified name defining bindings, such as the example outputs in the preceding paragraph) and a possible next set of questions that may produce completeness of the data model or at least tend to further complete the data model. For example, LLM 120 can use information indicating what data has been received and/or what data has not yet been received, and select a question configured to obtain data that has not yet been received.

At 408, LLM 120 can convert the bindings to a request to KE 110 formulated to cause KE 110 to perform calculations using the data in the data model. In some embodiments, yet another instance of LLM 120 may perform this portion of the process. For example, instance C 126 can convert the bindings to a KE 110 request. For example, LLM 120 can use a predefined mapping from an LLM 120 data model to a KE 110 data model, which can be used when the respective models have different formats or languages. For example, in some embodiments the LLM 120 data model is JSON and the KE 110 data model is XML, so a mapping between the two is used. This may be necessary because some LLMs 120 do not perform well using XML, so the LLM 120 can use JSON even if KE 110 uses XML. In some embodiments, the data model used by LLM 120 can be equivalent to the one used by KE 110, and no mapping would be necessary in such embodiments.

In some embodiments, translating can include applying a data extraction model to the user-generated response, thereby generating the machine-readable response. For example, rather than requesting bindings from LLM 120, system 100 can compare the unstructured text (or a processed version thereof, for example with extraneous conversational data removed) with the data model to identify data that matches elements of the model. This may be effective in cases where the LLM 120 asks the user for small amounts of information at a time (e.g., "what is your salary?"), because system 100 can use the known question topic to find and fill the appropriate entry within the data model.

Returning to FIG. 3, at 312, system 100 can process, by KE 110, the machine-readable response, thereby generating a calculation engine output. KE 110 can perform calculations or other processing using the available data that has been added to or otherwise related to the model through processing at 310. Using the tax calculation example, KE 110 can update an expected refund based on the information provided by the user thus far, for example.

At 314, system 100 can modify the UI to include an indication of the calculation engine output. For example, system 100 can send KE 110 output from 312, or an indication thereof, to client 20 through network 10, and client 20 can display this information in the UI. Again using the tax calculation example, client 20 can show an updated expected refund after each answer is provided by the user and each round of processing by KE 110 is performed.

At 316, system 100 can repeat process 300 if the data model is incomplete. For example, system 100 can determine that the data that has been received provides less than all of the data required to complete the data model, LLM 120 can make at least one additional request for at least a portion of remaining data in the manner described above. Additional instructions to LLM 120 can maintain the prevention against performing calculations but can prompt LLM 120 to ask different questions to obtain different data than in the previous iteration(s) of process 300. Additional answers can be received, translated, and processed as described above.

Figure 5:
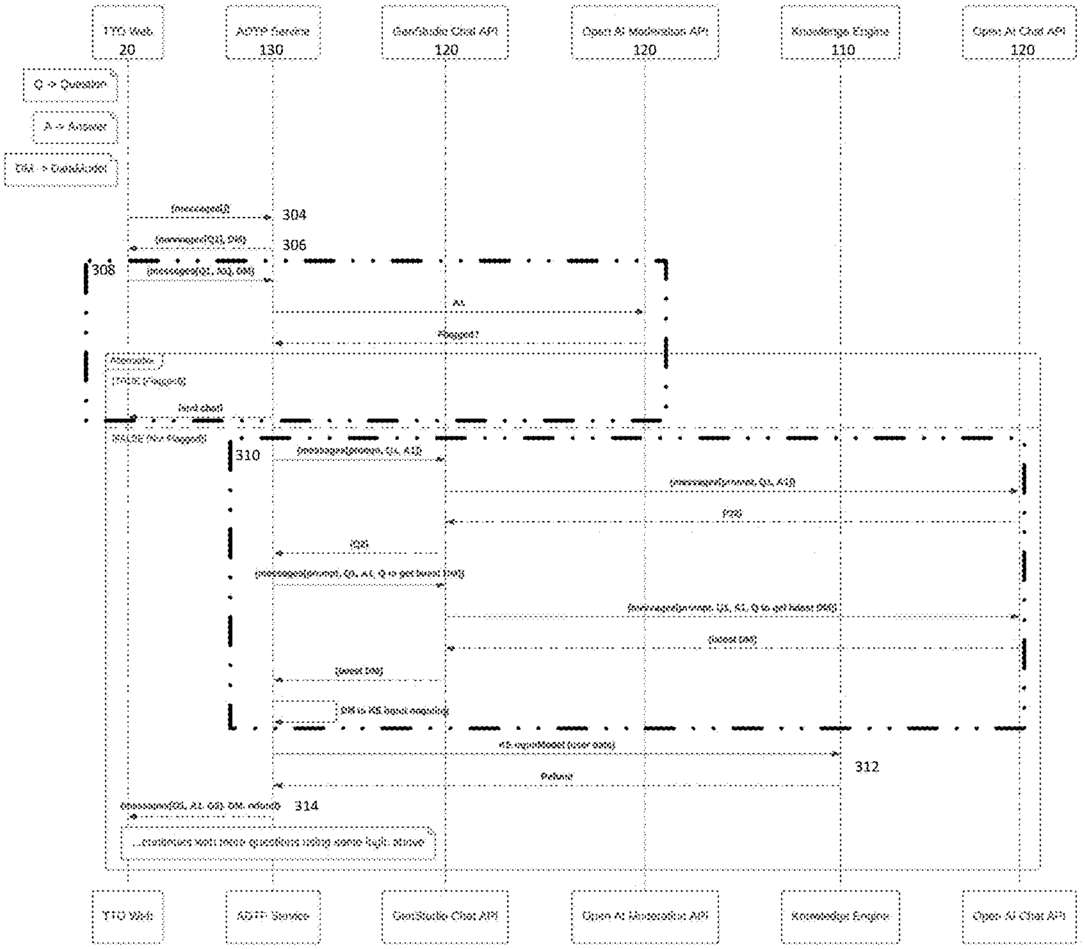
FIG. 5 shows an example integrated LLM/calculation call sequence according to some embodiments of the disclosure.

FIG. 5 shows an example integrated LLM/calculation call sequence 500 according to some embodiments of the disclosure. In the ladder diagram of call sequence 500, device elements are mapped to their equivalents in FIGS. 1A-1B and messages are mapped to their equivalents in FIG. 3. For example, the call sequence involves client 20 (TTO Web), KE 110 (Knowledge Engine), LLM 120 (GenStudio Chat API, Open AI Moderation API, and Open AI Chat API, which are APIs providing specific portions of LLM functionality in some example LLM 120 systems), and orchestration engine 130 (ADTP Service). Messages correspond with processing at 304-314 of process 300.

In some embodiments, system 100 may be configured to ensure and/or improve consistency of operations involving KE 110 and LLM 120 working in combination. System 100 may be configured to ensure and/or improve such consistency for other systems (e.g., where system 100 is a test system and other systems which may or may not be configured similarly to system 100 are runtime systems), system 100 may be configured to ensure and/or improve consistency of its own operations, or a combination thereof.

As described in detail below, system 100 may be configured to develop effective prompts and train LLM 120. This may include providing LLM 120 with deterministic data sets, targeting specific types of input data, and explicitly defining the desired output data format to effectively guide LLM 120 in generating the required outputs.

System 100 may simulate AI-assisted conversations, for example by executing a multi-stage AI interaction process including the following roles: a requesting bot configured to formulate queries and request specific input data, a responding bot configured to provide the corresponding data by simulating a human user in a production setting answering the requesting AI's questions based on LLM 120 guidance, and/or a summarizing bot configured to compile and summarize data obtained from the interaction into an expected output format. In some embodiments, different examples or "personas" of responding bots may be used to simulate conversations differently (e.g., "talkative and responds to everything," "skips questions," "tries to guide the conversation off-topic," etc.).

As with the runtime implementations described above, system 100 may include integration with a deterministic KE 110. System 100 may send the data generated by the LLM 120 through the multi-stage AI conversation to KE 110 to check for consistent and accurate computation of test results.

System 100 may perform regression tests by performing the tests multiple times to assess the operational effectiveness, ensuring a predetermined success threshold is consistently met. Regression tests may have randomness built in to ensure that the LLM 120 can be robust to many different types of inputs by users. For example, system 100 can set a temperature parameter of LLM 120 high so that LLM 120 provides relatively distinct responses with each regression test. The inclusion of regression tests in the process can increase the robustness of the system 100 evaluation, allowing it to handle the uncertainties of LLM 120 outputs.

The above-described operations allow for the creation of a system 100 that effectively combines the nuances of non-deterministic language models and deterministic calculation engines through the application of regression tests to ensure accurate and consistent outcomes.

Consistency testing and assurance embodiments of system 100 can leverage the multiple instances of LLM 120 (e.g., instance A 122, instance B 124, instance C 126, and/or additional instances (not pictured)). One or more instance may be provided with deterministic data sets, targeting specific types of input data, and with an explicit definition of the desired output data format to effectively guide the model in generating desired outputs.

The instances may be configured to simulate an AI-assisted conversation through a multi-stage AI interaction process including the following roles. One instance (e.g., instance A 122) may be configured to generate text for a requesting bot that formulates queries and requests specific input data. Another instance (e.g., instance B 124) may be configured to generate text for a responding bot providing the corresponding data by answering the requesting bot's questions. Yet another instance (e.g., instance C 126) may be configured to generate text for a summarizing bot that compiles and summarizes data obtained from the interaction into a desired output format (e.g., a format useable by KE 110, as described above).

System 100 can send the data generated by the LLM 120 through the multi-stage AI conversation to KE 110, which can perform calculations based on the data derived from the conversation to check the data and thereby ensure the consistent and accurate computation of test results.

System 100 can perform regression tests by running the above-referenced conversations multiple times to assess the operational effectiveness, ensuring a predetermined success threshold is consistently met. The inclusion of regression tests in the process can increase the robustness of the evaluation, allowing it to handle the uncertainties of LLM 120 outputs.

Figure 6:
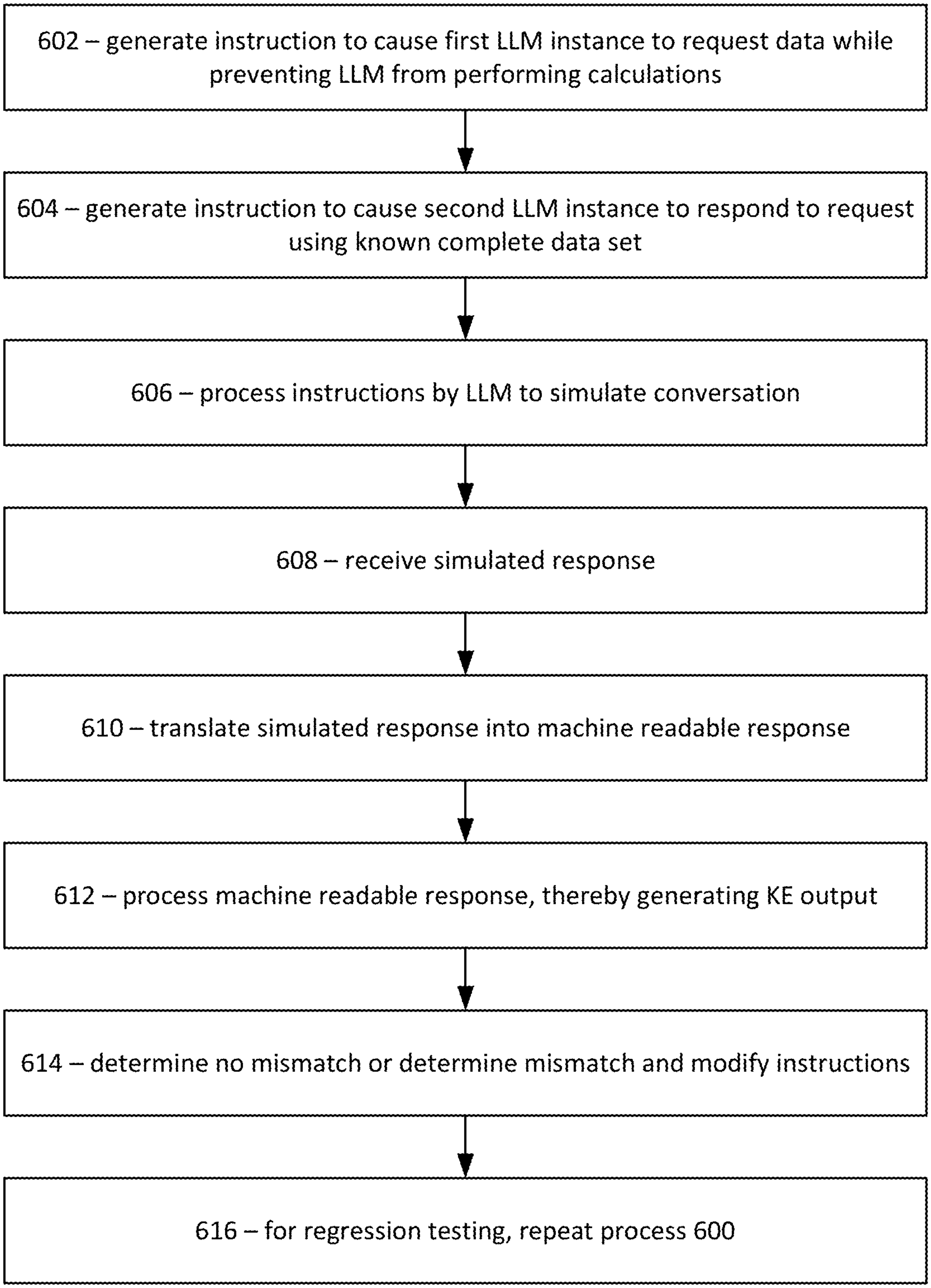
FIG. 6 shows an example integrated LLM/calculation test and configuration process according to some embodiments of the disclosure.

FIG. 6 shows an example integrated LLM/calculation test and configuration process 600 according to some embodiments of the disclosure. System 100 can perform process 600 in order to test for correct functioning of LLM 120 and/or improve its functioning to enable live interaction such as that presented in the context of process 200.

At 602, system 100 can generate an instruction (e.g., a first test instruction) configured to cause one instance of LLM 120 (e.g., instance A 122) to request data from a user while preventing instance A 122 from performing calculations using the data. These instructions may be similar to, or the same as, those used at 602 of process 300 as described above. In an example wherein instance A 122 is configured specifically for the purpose of functioning within system 100, the instruction can be hard-coded into LLM 120. If an off-the-shelf or otherwise more general purpose LLM 120 is used, the instruction can be in the form of a prompt given to instance A 122. The instruction may be supplied to instance A 122 as required by the configuration of the LLM 120, for example using an API of LLM 120 and/or by entering a textual prompt into a text form of LLM 120.

In some embodiments, the instruction can include a data model to be completed by data entered in response to questions posed by instance A 122. To continue the example wherein an integrated LLM 120/KE 110 is being used to fill in a tax return instead of a fully deterministic tax return system, the instructions can include the entire existing data model, or a portion thereof, that would otherwise have been traversed deterministically to complete the tax return. In some embodiments, the instruction can include a textual representation of the content of the data model. Including this as some or all of the prompt or context input to instance A 122 may allow instance A 122 to respond in a tailored (e.g., tax savvy) fashion, which causes instance A 122 to function similarly to LLM 120 in process 300, making process 600 an effective simulation of process 300. Alternatively or additionally, in the tax example, the instruction can include Internal Revenue Service (IRS) provided instructions for completing a tax return.

The data model may have multiple components thereof, so that the data instance A 122 is tasked with obtaining from the user comprises multiple parts. In this case, the instruction can be configured to cause instance A 122 to attempt to obtain a plurality of the multiple parts in a single user-generated response, or as few responses as possible. For example, instance A 122 can combine multiple questions into one, such as "Do you have any dividend or interest income?" In some cases, this can be context-sensitive (e.g., the previous question may be presented when income is below a threshold and the answer is likely "no" to both, whereas separate "Do you have interest," "Do you have dividends" questions can be posed when income is above the threshold and a "yes" answer becomes more likely).

In some embodiments, the instruction can restrict or prevent instance A 122 from processing the received data in the manner in which it is to be processed by KE 110. For example, instance A 122 can be directed not to perform calculations (e.g., tax calculations) using the data received from the user. In this way, system 100 can ensure that KE 110 is the component responsible for processing the received data (e.g., KE 110 is the component that ultimately performs calculations using the received data).

At 604, system 100 can generate an instruction (e.g., a second test instruction) configured to cause another instance of LLM 120 (e.g., instance B 124) to respond to a request from instance A 122 as though instance B 124 were a user attempting to perform the tasks enabled by system 100 (e.g., tax document preparation. For example, the instruction can attempt to simulate user input received in process 300 as described above. The instruction to instance B 124 can include a known complete data set. The known complete data set can be a completely filled-in data model or a full set of data needed to completely fill in the data model. The values of the data of the known complete data set may be known in order to facilitate checking of LLM 120 performance as described in detail below. In an example wherein instance B 124 is configured specifically for the purpose of functioning within system 100, the instruction can be hard-coded into LLM 120. If an off-the-shelf or otherwise more general purpose LLM 120 is used, the instruction can be in the form of a prompt given to instance B 124. The instruction may be supplied to instance B 124 as required by the configuration of the LLM 120, for example using an API of LLM 120 and/or by entering a textual prompt into a text form of LLM 120. A non-limiting example of an instruction configured to simulate a user may be as follows:

You are an individual in the US looking to file your taxes and you are talking to a tax expert.

You need to answer the expert questions based on your information, {persona_str} This is your information:

```
{
json.dumps(user_data_model, indent=4)
}
[details on user personality. e.g. "you have a tendency to bring the conversation off-topic"]
```

At 606, LLM 120 can process the instructions generated at 602 and 604 to simulate a conversation. For example, instance A 122 can process the first test instruction to thereby provide the request for data to instance B 124. Using the tax example discussed above, instance A 122 can ask a conversational text question such as "Do you have children?" or the like. Instance B 124 can process the second test instruction to thereby provide a response to the request for data generated by instance A 122. The response can include at least a portion of the data for filling in the data model (e.g., "Yes I have two children" or the like).

In some embodiments, system 100 can determine that the response by instance B 124 includes less than all of the data required to fill in the data model, which may suggest that the conversation should continue until all such data is collected. For example, the instructions to instance A 122 may indicate that, upon receiving some of the data that is less than all data required to fill in the data model, it should make at least one additional request for at least a portion of remaining data. In response, instance B 124 can provide at least one additional response to the at least one additional request, thereby providing more of the data for completing the model. The following is a non-limiting example of possible instructions to instance A 122:

Rules for Ending Conversation:—

The conversation ends only when all the fields in the data model have been answered by the user.

Moreover, in some embodiments, KE 110 may be configured to supply instance A 122 with information regarding whether the fields in the data model have been answered by the user. For example, KE 110 may have instructions encoded so that for each item in the data model, if the item is not filled in after an answer is received, KE 110 can return a request to formulate a question for collection of the item. This can help prevent issues wherein LLM 120 attempts to end the conversation early, if for some reason LLM 120 thinks the data model has been filled when it is not. In these scenarios, the deterministic completeness system can be used to ensure the conversation does not suffer from early stopping.

At 608, system 100 can receive some or all of the outcome of the simulated conversation between LLM 120 instances. The data received at 608 can include at least the simulated response by instance B 124, or a portion thereof, including the data for filling in the model.

At 610, system 100 can translate the simulate response into a machine-readable response in a format configured for processing by KE 110. In some embodiments, translating can include generating a translation instruction configured to cause LLM 120 to convert the user-generated response into the machine-readable response. LLM 120 can process the translation instruction, and KE 110 can receive the machine-readable response from LLM 120. In some embodiments, the translation instruction can be given to a third instance of LLM 120 (e.g., instance C 126). Instance C 126 can perform processing described as being performed by LLM 120 in the description of process 400 given above with respect to FIG. 4, for example. When multiple responses to multiple questions have been generated by instance B 124, the translating can include translating all responses to fill in the data model as much as possible.

At 612, system 100 can process, by KE 110, the machine-readable response, thereby generating a calculation engine output. KE 110 can perform calculations or other processing using the available data that has been added to or otherwise related to the model through processing at 310. Using the tax calculation example, KE 110 can update an expected refund based on the information provided by the simulated conversation, for example.

At 614, system 100 can determine whether or not there is a mismatch between the data collected through the simulated conversation and the data within the known complete data set. For example, KE 110 can process the data within the known complete data set to generate another calculation engine output, and orchestration engine 130 and/or KE 110 can compare the output generated at 612 with this output. In some embodiments, KE 110 may have previously perform the calculations using the known complete data set and may have access to a stored known result of such previously performed calculations. If the outputs are different, system 100 can determine that the wrong information was collected through the simulated conversation. It may be inferred that the questions asked by instance A 122 were not effective in obtaining accurate information from instance B 124, and the instructions may be modified to more accurately collect the information in a future attempt.

At 616, system 100 can repeat process 600 to perform regression testing. If modifications to the instructions were made at 614, repeating process 600 can determine whether the modifications improve the accuracy of data collection. On the other hand, even if no modifications were made, regression testing can be performed to ensure that repeated uses of the same instructions will provide repeatedly consistent results. If the accuracy of results degrades with repeated regression testing, system 100 can make modifications in future iterations of processing at 614, for example.

Figure 7:
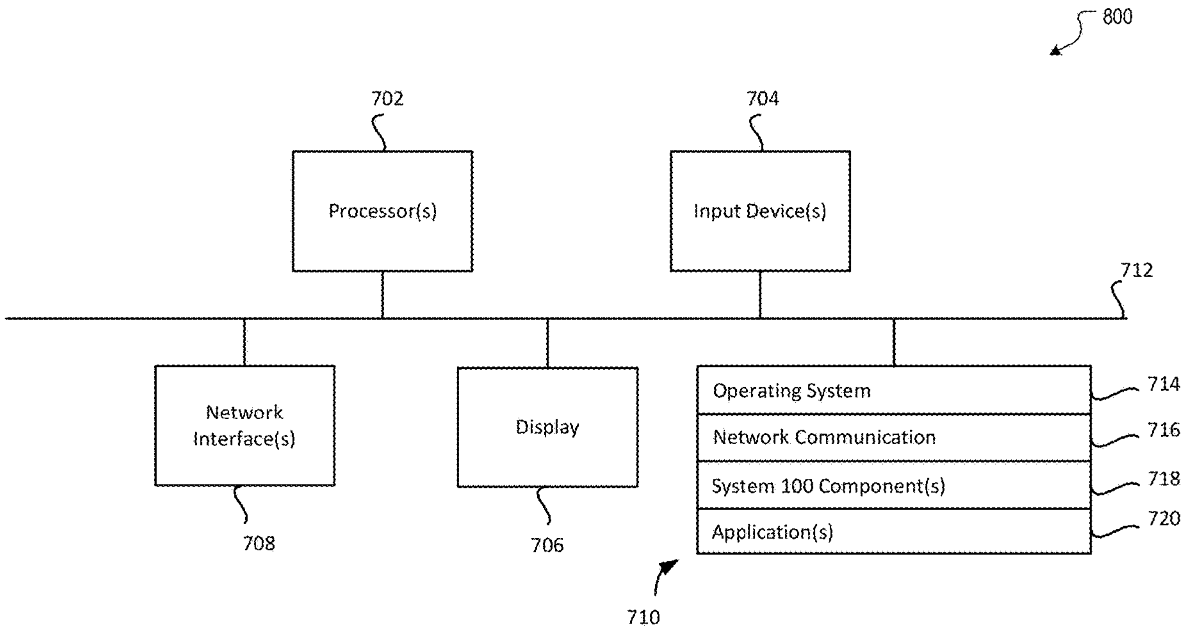
FIG. 7 shows a computing device according to some embodiments of the disclosure.

FIG. 7 shows a computing device 700 according to some embodiments of the disclosure. For example, computing device 700 may function as a single system 100 or any portion(s) thereof, or multiple computing devices 700 may function as a system 100.

Computing device 700 may be implemented on any electronic device that runs software applications derived from compiled instructions, including without limitation personal computers, servers, smart phones, media players, electronic tablets, game consoles, email devices, etc. In some implementations, computing device 700 may include one or more processors 702, one or more input devices 704, one or more display devices 706, one or more network interfaces 708, and one or more computer-readable mediums 710. Each of these components may be coupled by bus 712, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 712 may be any known internal or external bus technology, including but not limited to ISA, EISA, PCI, PCI Express, NuBus, USB, Serial ATA or FireWire. In some embodiments, some or all devices shown as coupled by bus 712 may not be coupled to one another by a physical bus, but by a network connection, for example. Computer-readable medium 710 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 may establish and maintain network connections (e.g., software for implementing communication protocols, such as TCP/IP, HTTP, Ethernet, telephony, etc.).

System 100 components 718 may include the system elements and/or the instructions that enable computing device 700 to perform functions of system 100 as described above. Application(s) 720 may be an application that uses or implements the outcome of processes described herein and/or other processes. In some embodiments, the various processes may also be implemented in operating system 714.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a backend component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term “at least one” may often be used in the specification, claims and drawings, the terms “a”, “an”, “the”, “said”, etc. also signify “at least one” or “the at least one” in the specification, claims and drawings.

Finally, it is the applicant’s intent that only claims that include the express language “means for” or “step for” be interpreted under 35 U.S.C. 112(f). Claims that do not expressly include the phrase “means for” or “step for” are not to be interpreted under 35 U.S.C. 112(f).

What is claimed is:

1. A method comprising:

providing a predefined data model to at least one large language model (LLM), the predefined data model defining data required to perform a calculation for a user;

generating, by at least one processor, an instruction configured to cause the at least one LLM to request data to fill in the predefined data model from the user while preventing the at least one LLM from performing calculations using the data;

presenting, by the at least one processor, a user interface (UI) including output of the at least one LLM to the user, wherein the request for data by the at least one LLM is made through the UI;

receiving, through the UI, a user-generated response to the request for data, the user-generated response including at least a portion of the data;

translating the user-generated response into a machine-readable response in a format configured for processing by a calculation engine executed by the at least one processor;

processing, by the calculation engine executed by the at least one processor, the machine-readable response, thereby generating a calculation engine output; and modifying, by the at least one processor, the UI to include an indication of the calculation engine output.

2. The method of claim 1, wherein in response to receiving the at least the portion of the data comprising less than all of the data, the at least one LLM makes at least one additional request for at least a portion of remaining data.

3. The method of claim 1, further comprising:

determining, by the at least one processor, that the at least the portion of the data that has been received comprises less than all of the data; and in response to the determining, generating, by the at least one processor, a second instruction configured to cause the at least one LLM to request remaining data from the user while preventing the at least one LLM from performing calculations using the remaining data, wherein the request for the remaining data by the at least one LLM is made through the UI.

4. The method of claim 3, further comprising:

receiving, through the UI, a second user-generated response to the request for remaining data, the second user-generated response including at least a second portion of the data;

translating the second user-generated response into a second machine-readable response in the format configured for processing by the calculation engine executed by the processor;

processing, by the calculation engine executed by the at least one processor, the second machine-readable response, thereby generating a second calculation engine output; and modifying, by the at least one processor, the UI to include an indication of the second calculation engine output.

5. The method of claim 1, wherein:

the data comprises multiple parts; and the instruction is further configured to cause the at least one LLM to attempt to obtain a plurality of the multiple parts in a single user-generated response.

6. The method of claim 1, wherein the translating comprises:

generating, by the at least one processor, a translation instruction configured to cause the at least one LLM to convert the a user-generated response into the machine-readable response; and receiving, by the at least one processor, the machine-readable response from the at least one LLM.

7. The method of claim 1, wherein the translating comprises applying, by the at least one processor, a data extraction model to the user-generated response, thereby generating the machine-readable response.

8. A method comprising:

providing a predefined data model to at least one large language model (LLM), the predefined data model defining data required to perform a calculation for a user;

generating, by at least one processor, an instruction configured to cause the at least one LLM to request data to fill in the predefined data model from the user while preventing the at least one LLM from performing calculations using the data;

presenting, by the at least one processor, a user interface (UI) including output of the at least one LLM to the user;

processing, by the LLM executed by the at least one processor, the instruction to thereby provide the request for data through the UI;

receiving, through the UI, a user-generated response to the request for data, the user-generated response including at least a portion of the data;

translating, by the at least one processor, the user-generated response into a machine-readable response in a format configured for processing by a calculation engine executed by the at least one processor;

processing, by the calculation engine executed by the at least one processor, the machine-readable response, thereby generating a calculation engine output; and modifying, by the at least one processor, the UI to include an indication of the calculation engine output.

9. The method of claim 8, further comprising:

determining, by the at least one processor, that the at least the portion of the data that has been received comprises less than all of the data;

in response to the determining, generating, by the at least one processor, a second instruction configured to cause the at least one LLM to request remaining data from the user while preventing the at least one LLM from performing calculations using the remaining data; and processing, by the LLM executed by the at least one processor, the second instruction to thereby provide the request for the remaining data through the UI.

10. The method of claim 9, further comprising:

receiving, through the UI, a second user-generated response to the request for remaining data, the second user-generated response including at least a second portion of the data;

translating, by the at least one processor, the second user-generated response into a second machine-readable response in the format configured for processing by the calculation engine executed by the processor;

processing, by the calculation engine executed by the at least one processor, the second machine-readable response, thereby generating a second calculation engine output; and modifying, by the at least one processor, the UI to include an indication of the second calculation engine output.

11. The method of claim 8, wherein:

the data comprises multiple parts; and the instruction is further configured to cause the at least one LLM to attempt to obtain a plurality of the multiple parts in a single user-generated response.

12. The method of claim 8, wherein the translating comprises:

generating, by the at least one processor, a translation instruction configured to cause the at least one LLM to convert the user-generated response into the machine-readable response;

processing, by the LLM executed by the at least one processor, the translation instruction; and receiving, by the calculation engine executed by the at least one processor, the machine-readable response from the at least one LLM.

13. The method of claim 8, wherein the translating comprises applying, by the at least one processor, a data extraction model to the user-generated response, thereby generating the machine-readable response.

14. A system comprising:

at least one processor; and at least one non-transitory computer-readable memory storing instructions that, when executed by the at least one processor, cause the at least one processor to perform processing comprising:

providing a predefined data model to at least one large language model (LLM), the predefined data model defining data required to perform a calculation for a user;

generating an instruction configured to cause at least LLM to request data to fill in the predefined data model from the user while preventing the at least one LLM from performing calculations using the data;

presenting a user interface (UI) including output of the at least one LLM to the user, wherein the request for data by the at least one LLM is made through the UI;

receiving a user-generated response to the request for data, the user-generated response including at least a portion of the data;

translating the user-generated response into a machine-readable response in a format configured for processing by a calculation engine executed by the at least one processor;

processing, by the calculation engine, the machine-readable response, thereby generating a calculation engine output; and modifying the UI to include an indication of the calculation engine output.

15. The system of claim 14, wherein in response to receiving the at least the portion of the data comprising less than all of the data, the at least one LLM makes at least one additional request for at least a portion of remaining data.

16. The system of claim 14, wherein the processing further comprises:

determining that the at least the portion of the data that has been received comprises less than all of the data; and in response to the determining, generating a second instruction configured to cause the at least one LLM to request remaining data from the user while preventing the at least one LLM from performing calculations using the remaining data, wherein the request for the remaining data by the at least one LLM is made through the UI.

17. The system of claim 16, wherein the processing further comprises:

receiving, through the UI, a second user-generated response to the request for remaining data, the second user-generated response including at least a second portion of the data;

translating the second user-generated response into a second machine-readable response in the format configured for processing by the calculation engine executed by the processor;

processing, by the calculation engine, the second machine-readable response, thereby generating a second calculation engine output; and modifying the UI to include an indication of the second calculation engine output.

18. The system of claim 14, wherein:

the data comprises multiple parts; and the instruction is further configured to cause the at least one LLM to attempt to obtain a plurality of the multiple parts in a single user-generated response.

19. The system of claim 14, wherein the translating comprises:

generating a translation instruction configured to cause the at least one LLM to convert the user-generated response into the machine-readable response; and receiving the machine-readable response from the at least one LLM.

20. The system of claim 14, wherein the translating comprises applying a data extraction model to the user-generated response, thereby generating the machine-readable response.

* * * * *